United States Patent
Schulte et al.

(10) Patent No.: US 8,668,768 B2
(45) Date of Patent: Mar. 11, 2014

(54) SYSTEM FOR PREVENTING CONTAMINANTS FROM REACHING A GAS PURIFIER

(71) Applicants: Thomas Robert Schulte, Grand Island, NY (US); Michael Henry Hawke, Olive Branch, MS (US); Keith Randall Pace, East Amherst, NY (US); Thomas John Bergman, Jr., Clarence Center, NY (US); Brian Donald Warrick, Colorado Springs, CO (US); Sandro DiSanto, Richardson, TX (US); Rick Boyer, Fort Worth, TX (US)

(72) Inventors: Thomas Robert Schulte, Grand Island, NY (US); Michael Henry Hawke, Olive Branch, MS (US); Keith Randall Pace, East Amherst, NY (US); Thomas John Bergman, Jr., Clarence Center, NY (US); Brian Donald Warrick, Colorado Springs, CO (US); Sandro DiSanto, Richardson, TX (US); Rick Boyer, Fort Worth, TX (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 13/685,756

(22) Filed: Nov. 27, 2012

(65) Prior Publication Data

US 2013/0081542 A1    Apr. 4, 2013

Related U.S. Application Data

(60) Division of application No. 13/157,708, filed on Jun. 10, 2011, now Pat. No. 8,343,262, which is a continuation of application No. 12/263,763, filed on Nov. 3, 2008, now Pat. No. 7,981,195.

(60) Provisional application No. 60/986,754, filed on Nov. 9, 2007.

(51) Int. Cl.
*B01D 53/02* (2006.01)

(52) U.S. Cl.
USPC .............. 96/109; 96/111; 96/134; 96/220; 96/399; 62/643; 95/138

(58) Field of Classification Search
USPC .............. 96/109, 111, 134, 220, 399; 62/643; 95/138
See application file for complete search history.

(56) References Cited

U.S. PATENT DOCUMENTS

| | | | |
|---|---|---|---|
| 4,668,260 A | 5/1987 | Yoshino | |
| 4,746,332 A | 5/1988 | Tomomura et al. | |
| 4,902,321 A | 2/1990 | Cheung | |
| 5,143,617 A | 9/1992 | Grabenkort | |
| 5,389,235 A | 2/1995 | Russ et al. | |
| 5,467,603 A | 11/1995 | Lehman et al. | |
| 5,507,855 A | 4/1996 | Barry | |
| 5,740,683 A | 4/1998 | Billingham et al. | |
| 5,983,667 A | 11/1999 | Markowski et al. | |

(Continued)

FOREIGN PATENT DOCUMENTS

AU    630639    5/1990

*Primary Examiner* — Christopher P Jones
(74) *Attorney, Agent, or Firm* — Nilay S. Dalal; Iurie A. Schwartz

(57) ABSTRACT

The present invention is directed to the prevention of an exothermic reaction in the gas purifier of an ultra-high purity gas system.

8 Claims, 3 Drawing Sheets

(56) References Cited

U.S. PATENT DOCUMENTS

| | | |
|---|---|---|
| 5,988,165 A | 11/1999 | Richey et al. |
| 6,068,685 A | 5/2000 | Lorimer et al. |
| 6,093,379 A | 7/2000 | Golden et al. |
| 6,168,645 B1 | 1/2001 | Succi et al. |
| 6,217,633 B1 | 4/2001 | Ohmi et al. |
| 6,395,064 B1 | 5/2002 | Xu et al. |
| 6,543,253 B1 | 4/2003 | Schaub et al. |
| 6,772,781 B2 | 8/2004 | Doty et al. |
| 6,824,752 B1 | 11/2004 | Terbot et al. |
| 7,097,689 B2 | 8/2006 | Billingham et al. |
| 2001/0032668 A1 | 10/2001 | Doty et al. |
| 2003/0143125 A1 | 7/2003 | Martin |

Ultra-High Purity Nitrogen Production System

SYSTEM FOR PREVENTING CONTAMINANTS FROM REACHING A GAS PURIFIER

RELATED APPLICATIONS

This application is a division of U.S. application Ser. No. 13/157,708, filed Jun. 10, 2011, now U.S. Pat. No. 8,343,262 B2, issued Jan. 1, 2013, which is a continuation of U.S. application Ser. No. 12/263,763, filed Nov. 3, 2008, now U.S. Pat. No. 7,981,195 B2, issued Jul. 19, 2011, which claims priority to U.S. Provisional Application Ser. No. 60/986,754, filed Nov. 9, 2007, all of which are incorporated herein by reference.

FIELD OF THE INVENTION

This invention relates to an ultra-high purity gas production plant. In particular, the invention is directed to the prevention of gas streams containing excessive contaminant levels from reaching and entering a gas purifier, thereby preventing an exothermic reaction from taking place in the purifier. Further, the novel system of the present invention eliminates the need to shut down the gas purifier or alternatively take it off-line.

BACKGROUND OF THE INVENTION

The manufacture of electronic components, such as semiconductor wafers, liquid crystal displays, light emitting diodes and solar cells typically requires nitrogen containing ten parts per billion (ppb) or less of several contaminants, including carbon monoxide, hydrogen, and oxygen. Nitrogen containing contaminants at these levels is referred to as ultra-high purity nitrogen. Ultra-high purity nitrogen is used, for example, to generate a contaminant-free atmosphere during various electronic component processing steps, thereby minimizing the number of defects in the product manufactured.

The base material utilized in the production of ultra-high purity nitrogen is air. With reference to FIG. 1, a conventional system 100 is depicted. Air is introduced into compressor 110 where it is compressed to a pressure ranging from 35 psig to 200 psig. The resulting high pressure air stream is fed to an adsorption system 120, which contains two or more beds arranged in parallel. Adsorption system 120 typically operates at or near ambient temperature and removes high boiling point contaminants such as water and carbon dioxide. The resulting purified air is routed to a cryogenic air separation unit 130 that contains, for example, at least one distillation column and removes the preponderance of moderate boiling point contaminants such as oxygen. The nitrogen stream which exits the air separation unit is a conventional purity nitrogen stream and typically contains 1-10 parts per million (ppm) oxygen, 1-10 ppm carbon monoxide and 1-10 ppm hydrogen. The air separation unit also produces an oxygen-containing stream that may be utilized in part to remove contaminants from adsorption system 120.

The conventional purity nitrogen stream is further purified in a chemical adsorption based gas purifier 140. This gas purifier typically contains a chemical adsorbent that is based on a metal, such as nickel, and reacts with and/or adsorbs any residual oxygen, hydrogen and carbon monoxide. Contaminants that have reacted with or adsorbed on the metal based catalyst are removed in a regeneration step by reaction and thermal desorption using a heated hydrogen/ultra-high purity nitrogen mixture. Typically, 1-10% of the ultra-high purity nitrogen stream is employed for this purpose. The nitrogen/hydrogen/contaminant mixture exiting the chemical adsorption based purification system 140 is discarded.

The ultra-high purity nitrogen stream generated in the purifier is then routed to filter system 150 to remove any particulates, and thereafter the ultra-high purity nitrogen stream is routed to the point of use.

The contaminant level in the conventional purity nitrogen stream exiting the air separation unit 130 can be compromised, for example, by air entering the system before the stream reaches the gas purifier 140. A high concentration of some contaminants/impurities, such as oxygen, can create an exothermic reaction. As a result, the chemical adsorbent in gas purifier 140 reaches temperatures exceeding a predetermined value, typically ranging between 120° F. and 400° F. This exothermic reaction can result in the destruction of the chemical adsorbent, as well as the release of aqueous corrosives which can destroy the gas purifier and contaminate downstream piping.

To prevent such a potentially catastrophic event from occurring, the gas purifier 140 is taken off-line and ultra-high purity nitrogen flow to the end user is discontinued if excessive contaminant levels are detected in the conventional purity nitrogen stream. The gas purifier 140 is isolated from the conventional purity nitrogen stream and the end user does not receive ultra-high purity nitrogen. Thus, a substantial economic loss is incurred.

Various attempts have been made to monitor the contaminant level in the incoming gaseous stream from the air separation unit, so as not to allow the purifier to exceed a specified temperature point. Specifically, the related art systems, are designed to include an oxygen sensor or otherwise a temperature detection mechanism to determine the level of contaminant in the nitrogen stream. Billingham et al in U.S. Pat. No. 7,097,689 B2 discloses gas sampling both upstream and downstream of the purifier. The gas streams are combined and sent to a single oxygen analyzer. If the oxygen levels are above a selected level, the gas analyzer will alert that the upstream or downstream gases contain too much oxygen.

U.S. Pat. No. 6,824,752 B1 to Terbot et al is directed to a system for protecting a purifier from damage that includes passing a stream of impure gas through a catalyst bed and measuring the temperature difference before and after the catalyzed bed reaction through a data analyzer to determine the impurity level in the gas.

U.S. Pat. No. 6,168,645 B1 to Succi et al relates to a safety device coupled either to the unpurified gas inlet line or the purified output line or both. This safety device develops an alarm signal when gas contaminants exceed a given concentration level for a period of time.

U.S. Pat. No. 6,068,685 discloses a gas purifier including a getter column having a metallic vessel and a containment wall extending between the inlet and the outlet. The getter material purifies gas flowing therethrough by adsorbing impurities therefrom. A first temperature sensor is located in the top portion of the getter material and a second temperature sensor is located in the bottom portion of the getter material to rapidly detect the onset of an exothermic reaction which indicates the presence of excess impurities in the gas which is to be purified.

The conventional systems described above, which are designed to prevent excessive contaminants such as oxygen from reaching the gas purifier, lack in certain respects. For example, oxygen analyzers/sensors typically requires 5-10 seconds to respond to an oxygen reading. Therefore, the conventional purity nitrogen stream could reach the gas purifier before an excessive oxygen level can be detected. Such an occurrence would necessitate the isolation of the gas purifier (i.e., take it off-line), when elevated oxygen levels are detected, causing discontinuation in the flow of ultra-high purity nitrogen to the end user. The loss of nitrogen flow can result in electronic component damage to the end user costing large amounts of monies.

In ultra-high purity gas production plants, it is increasingly desirable to design a system which prevents a gas stream containing excessive contaminant levels from reaching a chemical adsorption-based gas purifier, while maintaining continuous gas supply to the end user. Specifically, it is an object of the invention to prevent nitrogen containing excessive oxygen levels from reaching a chemisorbent-based gas purifier while maintaining nitrogen supply to the end user.

SUMMARY OF THE INVENTION

According to one embodiment, the present invention is directed to the prevention of an exothermic reaction in the gas purifier of an ultra-high purity gas production system. Although the system is described with reference to nitrogen, any number of inert gases such as argon and rare gases may be employed.

The oxygen level in conventional purity nitrogen leaving the air separation system is measured using an oxygen analyzer. The conventional purity nitrogen stream exiting the air separation system then enters a buffer volume that is upstream of the backup nitrogen tie-in point. This buffer volume is designed to delay the nitrogen from entering the purifier long enough for the oxygen analyzer to detect an excessive oxygen level, should one exist. If an excessive oxygen level is detected, the contaminated conventional purity nitrogen stream is isolated within the buffer volume and prevented from reaching the backup nitrogen tie-in point. Simultaneously, backup nitrogen flow is initiated to the gas purifier. As a result, the conventional purity nitrogen stream containing an elevated oxygen level does not reach the gas purifier and ultra-high purity nitrogen flow from the gas purifier to the end user is uninterrupted. The buffer volume is then back-purged with gas from the back-up source to extricate the contaminated gas. The air separation system stays isolated, i.e., conventional purity nitrogen from the air separation unit is vented and not redirected to the purifier until the source of the elevated contamination is determined.

BRIEF DESCRIPTION OF THE DRAWINGS

The objects and advantages of the invention will be better understood from the following detailed description of the preferred embodiments thereof in connection with the accompanying figures wherein like numbers denote the same features throughout and wherein:

FIG. 2 is schematic diagram of an ultra-high purity nitrogen production plant system with a buffer volume disposed in conjunction with a critical operating parameter analyzer upstream of the back-up nitrogen tie-in.

DETAILED DESCRIPTION OF THE INVENTION

The present invention provides an ultra-high purity nitrogen production plant a system designed to capture conventional purity nitrogen downstream of an air separation unit 130, prior to reaching a gas purifier, if excessive oxygen levels are observed thereby preventing an exothermic reaction from occurring therein. Additionally, the system provides a means to route conventional purity backup nitrogen to the gas purifier. As a result, the system of the present invention eliminates the need to shut down or otherwise take the gas purifier off-line in order for the operator to address the effects of an exothermic reaction in the chemisorbent bed, including the potential release of chemical corrosives, such as aqueous hydrochloric or sulfuric acid.

Figure 1:
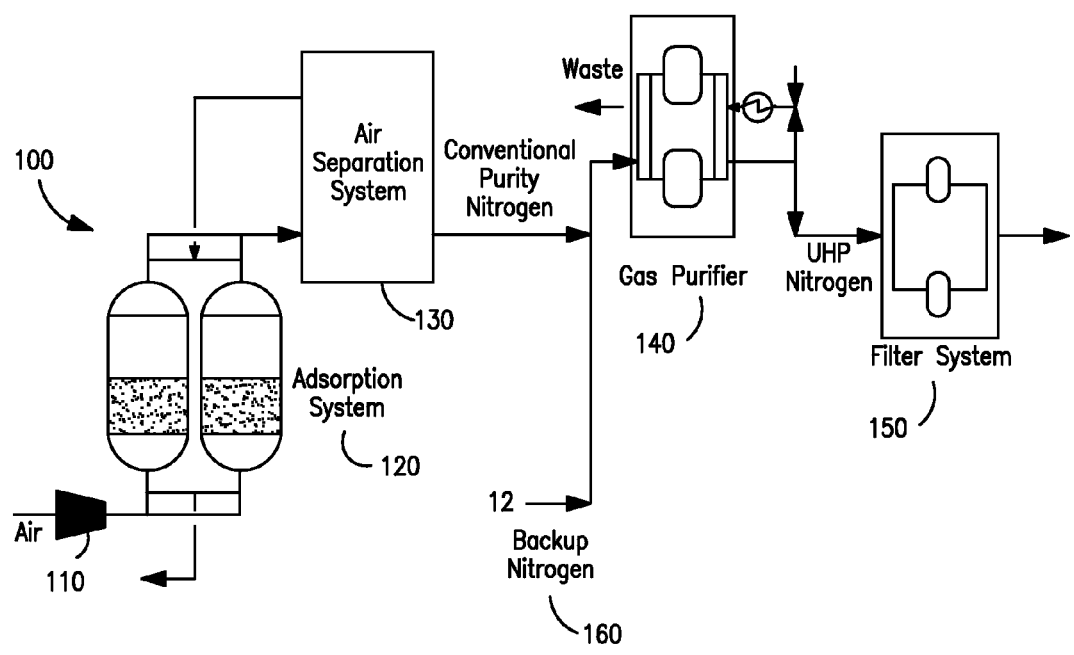
FIG. 1 is a schematic representation of an ultra-high purity nitrogen production plant system.

Although the system is described with reference to nitrogen, it will be understood that other inert gases such as argon and rare gases may be employed. As illustrated in FIG. 1, air received from adsorption system 120 is processed in air separation unit 130 and a conventional purity stream is transmitted to a gas purifier 140 for further processing into an ultra-high purity gas. These systems typically employ one or two distillation columns and produce nitrogen as a product. These air separation units having distillation columns to separate nitrogen from oxygen and other components are described in U.S. Pat. Nos. 5,740,683 and 6,543,253, which are incorporated by reference in their entirety.

Typically nitrogen leaves the air separation system at a flow rate ranging from 1,000 cfh-NTP to 1,000,000 cfh-NTP, preferably between 5,000 cfh-NTP and 750,000 cfh-NTP and most preferably between 10,000 cfh-NTP and 500,000 cfh-NTP. This conventional purity nitrogen typically contains between 0.1 and 10 parts per million each of hydrogen, carbon monoxide and oxygen.

Figure 2:
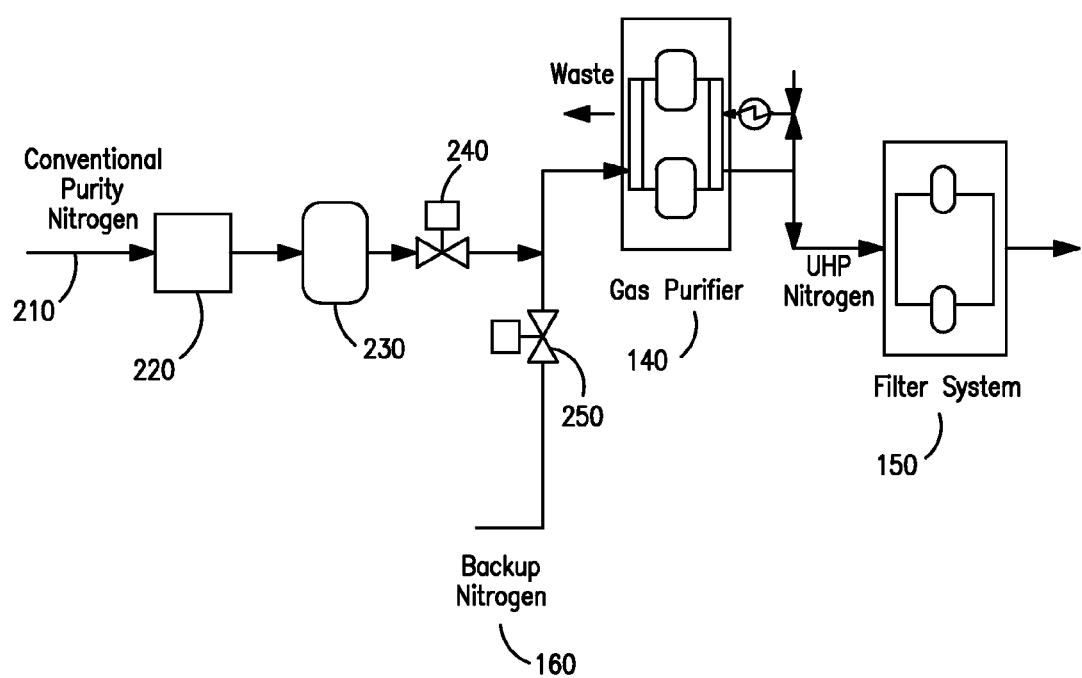

With reference to FIG. 2, and in accordance with one aspect of the invention, the conventional purity nitrogen stream exiting the air separation unit is routed through line 210 to the gas purifier 140. Although carbon monoxide, hydrogen and some other contaminants are removed in gas purifier 140, oxygen is the contaminant of greatest interest for the reasons aforementioned. Therefore, a portion of the conventional purity nitrogen stream is routed to a contaminant detecting device, such as an oxygen analyzer 220. This device measures the oxygen level in the nitrogen stream. Typically, the device can be a zirconium oxide based analyzer, such as the commercially available Thermox Model Number TM 2000. The analyzer has a response time associated with it, which commonly ranges from about 2 to 30 seconds, typically 4 to 20 seconds and often times between 5 to 10 seconds.

To guard against false elevated oxygen level measured, multiple oxygen analyzers may be employed. An excessive oxygen level is not found to be present unless such a level is indicated in more than one analyzer.

It has been found that installation of a properly designed and placed buffer volume 230 (sometimes referred to as a ballast, or buffer vessel) in relation to the oxygen detection device, as well as the back-up nitrogen gas line tie-in, can enable detection of excessive oxygen levels in conventional purity nitrogen removed from the air separation unit and prevents nitrogen containing excessive oxygen levels from reaching the gas purifier.

With continued reference to FIG. 2, the conventional purity nitrogen is routed through buffer vessel 230 en route to the gas purifier. The buffer vessel is designed such that the time required for the conventional stream to pass therethrough exceeds the oxygen detection device response time. For instance, a typical oxygen detector might require seven seconds to respond. Therefore, the buffer vessel would be sized to capture and hold the nitrogen stream therein for seven seconds, and optimally for greater then seven seconds (for example, ten seconds). In this manner, the contaminated gas is contained before it can reach the gas purifier. The oxygen level is detected by device 220, and a signal is sent to a control unit such as a program logic controller (PLC) which compares the reading to the predetermined acceptable level. If the reading exceeds the acceptable level, isolation valve 240 is closed, valve 250 is opened and conventional purity nitrogen is routed from a back-up nitrogen source. This source can be a separate air separation unit or simply a source of bulk nitrogen, wherein the bulk nitrogen has been purified to a conventional level. As a result, a continuous supply of gas is provided to the gas purifier and ultimately the end user.

To ensure that the contaminated nitrogen stream is captured prior to making its way to the gas purifier, buffer vessel 230 must be properly sized. The dimensions of the buffer vessel are determined based on the flow rate and operating pressure of the gas, as well as the response time of the detection device. The buffer vessel volume may be calculated using the equation:

$$\text{Buffer Volume} = N_2 \text{ mass flow rate} \times \text{delay time} / N_2 \text{ density}$$

In an exemplary embodiment, if the conventional purity nitrogen flow rate is 100,000 cfh-NTP and the operating pressure is 100 psig, the vessel volume will need to be 35.6 ft$^3$ to delay the nitrogen stream for 10 seconds. The buffer vessel would be configured as a three foot diameter vessel having a height of five feet. If the vessel dimensions were to become unwieldy, multiple vessels could be used. In this embodiment, if the nitrogen flow rate were 200,000 cfh-NTP, then two-3 foot diameter by five foot high vessels could be used. These vessels could be installed in series or in parallel.

Figure 3:
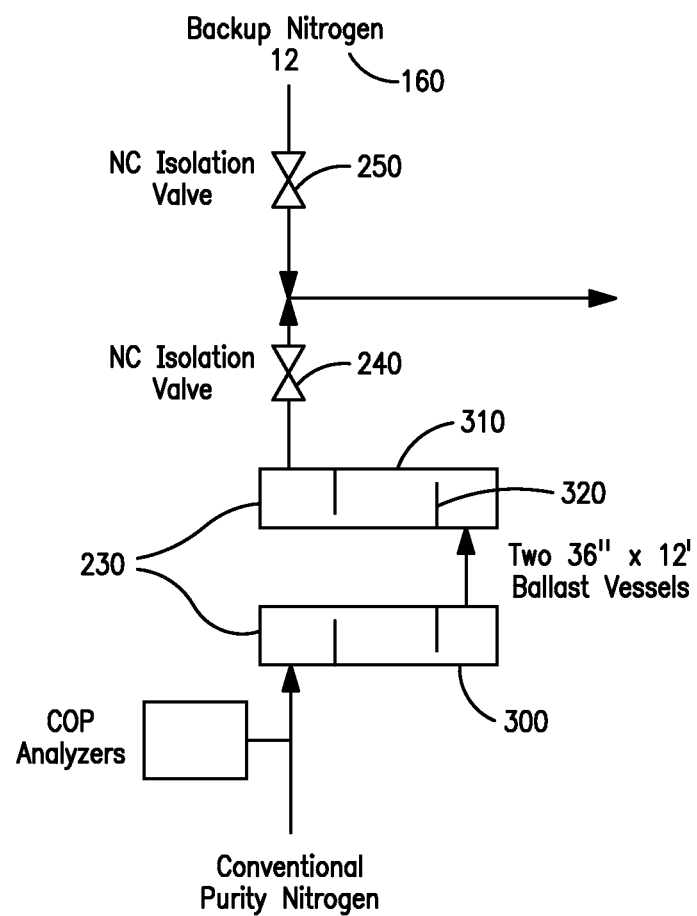
FIG. 3 illustrates modified buffer volume placed in series within the ultra-high purity nitrogen plant system.

Proper buffer vessel design is critical to the successful implementation of the ultra-high purity nitrogen production system of this invention. An empty horizontal or vertical vessel could be used in which nitrogen enters one vessel head and leaves the other. However, it is likely that with such a vessel design, most of the nitrogen would flow straight through the middle of the vessel without mixing with the vessel contents. As a result, the delay time would be lower than anticipated. With reference to FIG. 3, a buffer vessel design is provided. Conventional grade nitrogen enters a ballast vessel 300 at its side rather than through the vessel head. This forces the nitrogen to follow a tortuous path as it passes through the vessel, allowing it to mix with the vessel contents. The nitrogen could potentially pass through a second ballast vessel 310 installed in series with the first ballast vessel if extra delay time is required, as described earlier. Further, baffles 320 may be installed in the vessel to cause the nitrogen stream to follow an even more tortuous path and mix with the vessel contents.

In this exemplary embodiment, when the oxygen detection device detects an oxygen level between 10 parts per million and 10%, preferably between 50 parts per million and 1% and most preferably between 100 parts per million and 0.1%, the conventional purity nitrogen flow is discontinued by closing feed valve 240 which is disposed downstream of the buffer volume 310. This traps the nitrogen containing an elevated oxygen level in the buffer volume and prevents it from entering the gas purifier 140. Backup nitrogen flow 160 is then initiated to the gas purifier by opening the backup nitrogen feed valve 250. This backup may be stored in gaseous or liquid phase. The latter would require evaporation prior to delivery to the gas purifier. Oxygen analysis is not required for the backup nitrogen stream because it is extremely rare for backup nitrogen to have an oxygen content that exceeds the levels that are acceptable to gas purifiers. The backup nitrogen is purified in gas purifier 140, which typically contains a nickel-based catalyst and operates at near ambient temperature. It will be recognized by those skilled in the art that other chemical adsorbents can be utilized, including but not limited to palladium, zirconium, platinum, rhodium, ruthenium or titanium.

The metal based catalyst reacts with and/or adsorbs residual oxygen, hydrogen and carbon monoxide, thereby removing them from the conventional purity nitrogen stream and producing an ultra-high purity nitrogen stream. The ultra-high purity nitrogen leaving the chemical adsorbent-based system contains between 0 and 20 parts per billion each of hydrogen, carbon monoxide and oxygen, preferably between 0 and 10 parts per billion each of hydrogen, carbon monoxide and oxygen and most preferably between 0 and 1 part per billion each of hydrogen, carbon monoxide and oxygen. With reference back to FIG. 2, ultra-high purity nitrogen stream flows to a filtration system 260 where particles such as chemical adsorbent dust and metals are removed and finally to the end user. Because backup nitrogen flow was initiated, ultra-high purity nitrogen flow to the end user is not disrupted.

While the invention has been described in detail with reference to specific embodiments thereof, it will become apparent to one skilled in the art that various changes and modifications can be made, and equivalents employed.

What is claimed is:

1. A contaminant gas detection apparatus for protecting a downstream gas purifier from damage, comprising:
a gas analyzer disposed upstream of a buffer vessel, the gas analyzer configured to detect a contaminant concentration of hydrogen, oxygen and carbon monoxide in a conventional purity gas stream, the gas analyzer comprising a detection response time for detecting the contaminant concentration; and
the buffer vessel downstream and in fluid communication with the gas analyzer, the buffer vessel comprising a buffer volume sufficient to hold up a predetermined volume of a conventional purity gas stream prior to routing the conventional purity gas stream to the gas purifier, the buffer vessel configured for holding up the predetermined volume of the conventional purity gas stream for at least a time equal to the detection response time of the analyzer to allow the gas analyzer to determine if the contaminant in the conventional purity gas stream exceeds a predetermined level;
wherein the gas analyzer and the buffer vessel are in fluid communication with each other to isolate and contain the conventional purity gas stream if the contaminant concentration exceeds the predetermined level.

2. The contaminant detection apparatus of claim 1, wherein the buffer volume is sized based on the formula:

$$\text{buffer volume} = \text{mass flow rate of conventional purity gas} \times \text{delay time} / \text{density of said gas}.$$

3. The contaminant detection apparatus of claim 1, further comprising an isolation valve between the buffer vessel and the gas purifier.

4. The contaminant detection apparatus of claim 1, wherein the buffer vessel comprises one or more baffles.

5. The contaminant detection apparatus of claim 1, wherein the buffer vessel is configured horizontally to receive the contaminant conventional purity gas stream.

6. The contaminant detection apparatus of claim 1, further comprising a plurality of buffer vessels, wherein the plurality of vessels is configured in series to each other.

7. The contaminant detection apparatus of claim 1, further comprising a back-up conventional purity gas supply unit situated upstream of the gas purifier.

8. The contaminant detection apparatus of claim 1, whereby if the contaminant concentration detected by the analyzer upstream of the buffer vessel exceeds a predetermined level, the contaminated conventional purity gas stream can be prevented from reaching the gas purifier and causing an exothermic reaction.

* * * * *